April 18, 1967  M. L. CROALL  3,314,522
ARTICLE HANDLING APPARATUS
Filed July 19, 1965  2 Sheets-Sheet 1
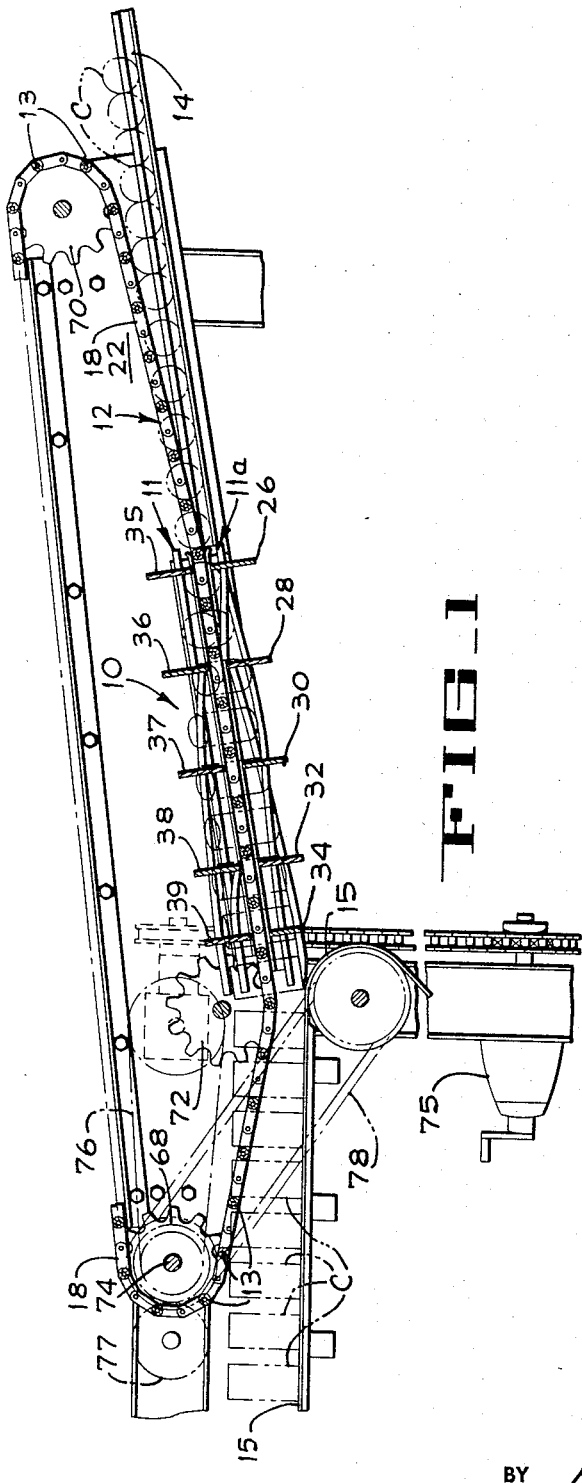
FIG_1
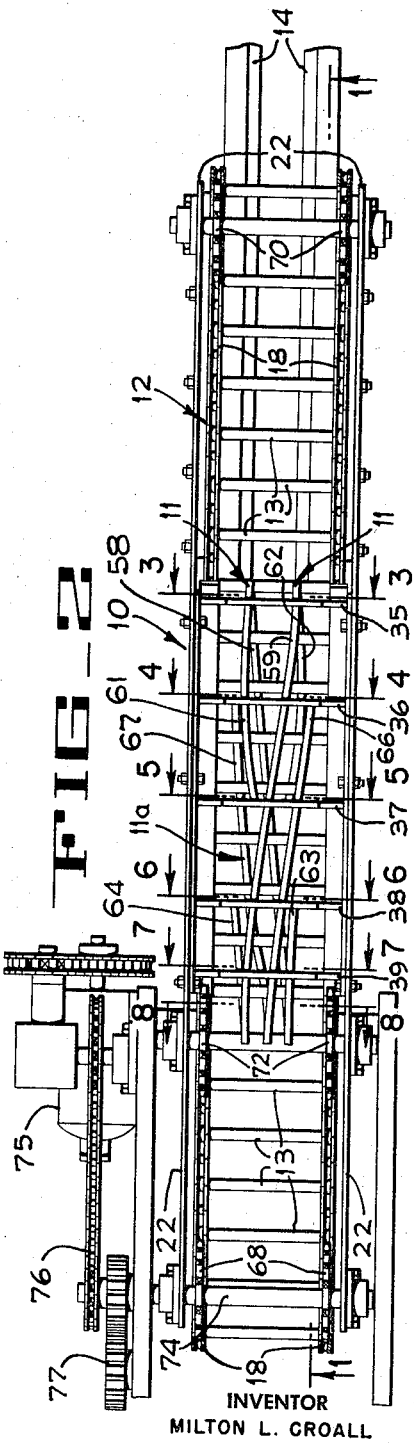
FIG_2
INVENTOR
MILTON L. CROALL
BY *Hans G. Hoffmeister*
ATTORNEY April 18, 1967  M. L. CROALL  3,314,522
ARTICLE HANDLING APPARATUS
Filed July 19, 1965  2 Sheets-Sheet 2
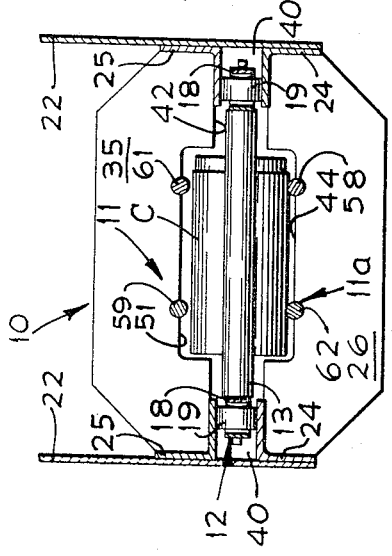
FIG_3
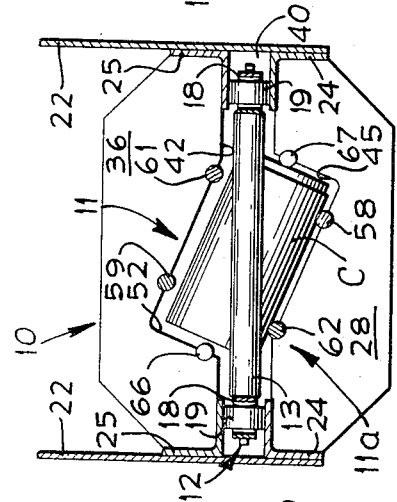
FIG_4
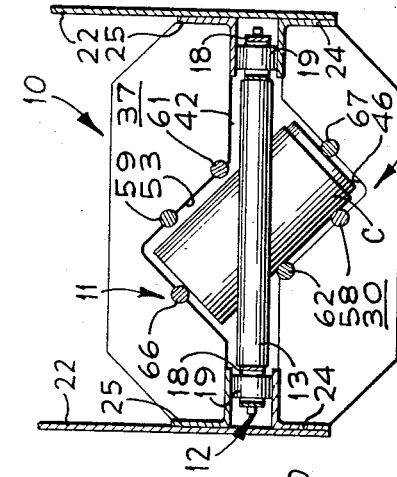
FIG_5
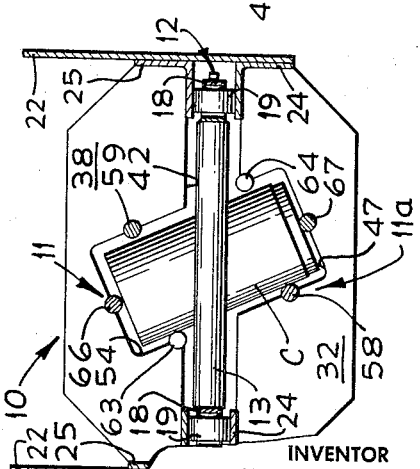
FIG_6
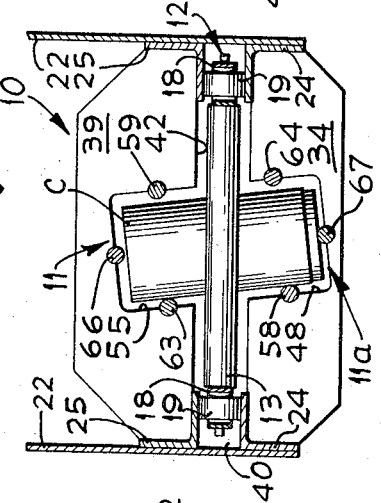
FIG_7
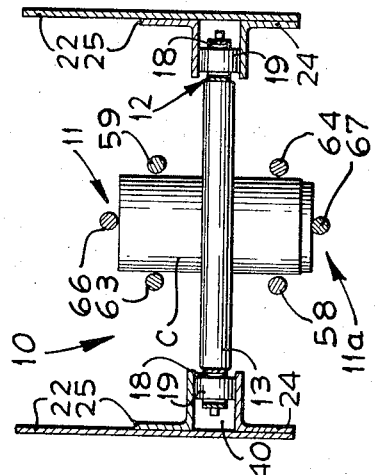
FIG_8
INVENTOR
MILTON L. CROALL
BY *Hans G. Hoffmeister*
ATTORNEY

United States Patent Office 3,314,522
Patented Apr. 18, 1967

3,314,522
ARTICLE HANDLING APPARATUS
Milton L. Croall, Los Gatos, Calif., assignor to FMC Corporation, San Jose, Calif., a corporation of Delaware
Filed July 19, 1965, Ser. No. 472,975
12 Claims. (Cl. 198—33)

The present invention relates to an apparatus for handling articles and more particularly, to apparatus for turning each of a row of abutting horizontal articles from a horizontal to a vertical position while positively advancing the articles along a path in predetermined spaced relationship.

A machine that employs the apparatus of the present invention is described in the co-pending United States Patent application of Allison E. Pech, Serial No. 473,107, filed on even date herewith, and assigned to the assignee of the present invention.

In article handling machinery and particularly in food processing equipment, it is often necessary to turn or rotate each of a continuously moving series of abutting articles from a horizontal to a vertical position. Also, subsequent operations often require that the vertical articles be presented in evenly spaced relationship and be timed with the subsequent operation. Although the instant device will perform equally well with articles of various configurations, it is particularly applicable to the difficult operation of reorienting cylindrical articles, such as cans, when the articles are moved along a path which varies only silghtly in elevation. A continuously moving row of rolling cylindrical articles is difficult to turn to upright position because they will continue to rotate during the turning operation and must be closely encompassed by rails or the like to maintain control over the articles during the turning operation thereby preventing the articles from becoming jammed in the apparatus. Heretofore, cylindrical articles were propelled through turning mechanisms by gravity, and were thereafter spaced in a separate operation.

It is, therefore, an object of the present invention to provide an apparatus for positively advancing articles along a path while turning or twisting the articles from a horizontal to a vertical position.

Another object is to provide an improved article twisting apparatus for turning the articles through an arc lying on a plane perpendicular to the path of movement of the article.

Another object is to provide an apparatus for turning or twisting a positively driven, continuously moving row of articles.

Another object is to provide apparatus for simultaneously spacing and turning a continuously moving row of cylindrical articles received from a row of such articles and for maintaining a predetermined spacing and rate of movement of the articles during the turning operation.

These and other objects and advantages of the present invention will become apparent from the following description and the accompanying drawings in which:

FIGURE 1 is a longitudinal vertical section of the turning apparatus of the present invention showing the articles turning, said section being taken along lines 1—1 of FIGURE 2.

FIGURE 2 is a plan view of the apparatus of FIGURE 1 with parts broken away.

FIGURES 3-8 are a sequence of vertical transverse sections taken along their respective section lines in FIGURE 2 and illustrating a container being turned or twisted from a horizontal to a vertical position.

In general, the twisting and spacing apparatus 10 (FIGS. 1 and 2) of the present invention comprises upper and lower twisting tracks or guideways 11 and 11a, respectively, which cooperate with a continuously moving timing conveyor 12 that employs freely rotatable pusher bars 13 to engage and positively urge the articles through the twisting tracks 11 and 11a in spaced sequence. When the articles are cylindrical, the instant twisting tracks 11 and 11a and the freely rotatable pusher bars 13 make jamming virtually impossible. Furthermore, the individual engagement of each article prevents the articles from striking one another and interlocking during passage through the critical twisting area.

More particularly, the apparatus 10 comprises any suitable feed conveyor such as a chute 14 (FIG. 1) which guides a continuously moving row of horizontal cylindrical articles C to the timing conveyor 12 and to the tracks 11 and 11a wherein the articles are twisted into vertical positions and are discharged onto any suitable discharge conveying means such as a belt conveyor 15. The articles C are positively urged through the twisting and spacing apparatus 10 by the pusher bars 13 which are mounted for free rotation on a pair of chains 18 of the timing conveyor 12.

The discharge end of inlet chute 14 is fastened between a pair of spaced side plates 22 (FIG. 2) which are mounted on a processing machine which is not shown herein but is fully disclosed in the aforementioned co-pending application of Pech. Mounted on the lower inner surface of each side plate 22 is a lower angle member 24 (FIGS. 3-8) and an upper angle member 25, each angle member having one flange extending inwardly toward the inner surface of the opposite side plate 22. The flanges on adjacent angle members 24 and 25 are spaced and cooperate to define tracks for rollers 19 of the associated chains 18 of the timing conveyor 12. Mounted on the lower angle members 24 perpendicular to the side plates 22 is a series of depending lower spacer plates 26, 28, 30, 32 and 34 (FIG. 1) of the lower twisting track 11a. Similarly, the pair of upper angle members 25 supports a series of upstanding upper spacer plates 35, 36, 37, 38 and 39 mounted thereon, each plate being disposed in the same plane as one of the lower plates.

As mentioned above, the lower and upper angle members 24 and 25, respectively, are spaced such that their parallel confronting flanges provide a pair of guide tracks 40, shown generally in FIGS. 3-8, for the rollers 19 of the timing chains 18 as they pass through the twisting tracks 11 and 11a. Consequently, the confronting edges of the upper and lower spacer plates are spaced to provide slots 42 which permits passage of the pusher bars 13 through the twisting and spacing apparatus 10. As best shown in FIGS. 3-8, the central section of each lower spacer plate 26, 28, 30, 32 and 34 is provided with a cut-out portion 44-48, respectively. Likewise, the central section of each upper spacer plate 35-39 is provided with a mating or complementary cut-out portion 51-55, respectively. Thus the cut-out portions of each co-planar set of spacer plates provides a completed rectangular aperture which permits passage of articles C through the twisting and spacing apparatus 10. Also, it will be noted that the cut-outs in the spacer plates are so formed that the long dimension or longitudinal centerline of the rectangular apertures progressively changes from a horizontal to a vertical position.

Three groups of guide rods are welded to the spacer plates in the cut-out portions. The first group comprises rods 58 and 59 which extend for the total length of the twisting tracks 11 and 11a. These rods 58 and 59 are curved to follow the contours of the cut-out portions of the successive spacer plates and, as viewed in FIGURES 3-8, are each in the form of a fragment of a spiral which is wound clockwise. Thus, for example, the portion of the rod 58 as shown in FIG. 8 is higher and to the left of the portion of rod 58 seen in FIG. 4.

The second group of guide rods comprises rods 61, 62, 63 and 64. Rods 61 and 62 extend only through the first half of twisting and spacing apparatus 10 (FIGS. 3, 4 and 5), whereas rods 63 and 64 extend only through the last half of the twisting apparatus 10 (FIGS. 6, 7 and 8). Thus, as can be readily seen, the gap provided by the shorter rods of the second group permit the unobstructed passage of the pusher bars 13 through the twisting apparatus 10.

The third group of guide rods comprises rods 66 and 67 which begin at the set of co-planar spacer plates shown in FIG. 4 and extend through the remainder of the twisting track as shown in FIGS. 5–8. The rods 66 and 67 are adapted to be contacted by the ends of the articles C. The bars 61, 62, 63, 64, 66 and 67 of the second and third groups of rods are spiralled in a clockwise direction in a manner similar to that described for the rods 58 and 59 of the first group. Thus, the guide rods provide a smooth, low friction guiding and supporting surface for the articles C as they are positively urged through the twisting tracks 11 and 11a by the timing conveyor 12.

With reference to FIGS. 1 and 2, the timing conveyor 12 comprises the pair of identical timing chains 18 which are trained around pairs of drive sprockets 68 and pairs of idler sprockets 70 and 72. Drive sprockets 68 are keyed to a drive shaft 74 which is journalled in a support structure 73 and is driven in timed relation with a processing machine, not shown, by any suitable power means such as a motor 75 connected to the shaft 74 by a chain drive 76. The processing machine has an overhead conveyor (not shown) that may be driven from shaft 74 by a gear train 77 in the manner illustrated in the aforementioned copending application of Pech.

Journalled on and extending between the chains 18 are the previously mentioned series of freely rotatable, evenly spaced pusher bars 13. Pusher bars 13 engage the articles C near the inlet end of the twisting tracks 11 and 11a and move the articles through the twisting tracks. The articles are then positively urged by the pusher bars 13 into engagement with the discharge conveyor 15 which is mounted adjacent the discharge end of the twisting tracks 11 and 11a and is driven from shaft 74 by means of a belt drive 78.

As best seen in FIGURES 3–8, the bars 13 engage each article C approximately in a horizontal plane passing through its center of gravity and maintain this contact until the articles are positively urged through the twisting tracks 11 and 11a onto discharge conveyor 15. With the bars 13 engaging the articles C at their centers of gravity, and with the articles being closely confined by the groups of curved rods, it is virtually impossible for the articles to tip and become jammed.

The operation of the twisting apparatus 10 of the present invention is as follows:

Articles C are presented on inlet chute 14 in an abutting row, with their axes horizontal. As the articles approach the twisting and spacing apparatus 10, the moving pusher bars 13 of the continuously driven conveyor 12 engage the articles substantially in a plane passing through the horizontal axis of each article. Particularly with cylindrical articles, the inter-engagement between the cylindrical article surface and the cylindrical pusher rods 13, as they move downwardly between the abutting articles to space the articles, provides a rolling, self-adjusting engagement and eliminates any possibility of jamming. The articles are then positively urged through the twisting tracks 11 and 11a by the pusher bars 13 which are journalled to and are guided by the chains 18 that ride in the tracks 40 defined by the lower and upper angle members 24 and 25, respectively. As the articles engage the three sets of guide rods, the articles are forced to rotate from a horizontal to a vertical position. The articles are then positively urged onto the discharge conveyor 15 in timed and spaced relationship, and the pusher bars 13 move up and out of engagement with the articles as the discharge conveyor 15 moves the evenly spaced upstanding articles away from the apparatus 10.

From the foregoing description, it is apparent that the twisting and spacing apparatus receives abutting articles with their longitudinal axes disposed horizontally, and simultaneously spaces these articles a predetermined distance apart while twisting or turning each article about an axis transverse to the longitudinal axis of the article and parallel to the direction of movement of the article so that the longitudinal axis of the article is moved to a vertical plane. While the twisting and spacing operation is performed, the articles are also positively advanced along this path of movement at a predetermined speed.

While a preferred apparatus for carrying out the invention has been shown and described, it will be understood that it is capable of modification and variation while still employing the principles of the invention. For example, in some cases, the groups of rods could be arranged so as to twist containers from a position where their longitudinal axes are vertical to a position where their longitudinal axes are horizontal as opposed to the arrangement shown in the preferred embodiment where the containers are twisted from the horizontal to the vertical.

It is to be understood, therefore, that the scope of the invention should be limited only by the scope and proper interpretation of the claims appended thereto.

Having thus described the invention, that which is believed to be new and for which protection by Letters Patent is desired is:

1. In an article processing apparatus the combination of an inclined article feeding chute adapted to advance abutting horizontal articles, a driven discharge conveyor adapted to receive a series of spaced vertical articles, twisting means disposed between said chute and said conveyor for engaging and progressively turning abutting articles between a position wherein the longitudinal axis of each article is horizontal and a position wherein said longitudinal axis is vertical as the article is moved past said turning means, a plurality of equally spaced pusher means movable between each article for positively engaging said articles and urging them through said twisting means while spacing said articles, and means for supporting and advancing said plurality of pusher means over said article feed chute and through said twisting means, said supporting and advancing means including an inclined portion disposed over and inclined at a greater angle than said inclined article feeding chute for simultaneously inserting a plurality of pusher means between an associated plurality of abutting articles to contact and gradually space the articles a predetermined distance apart prior to their entry into said twisting means.

2. The twisting and spacing apparatus defined in claim 1 wherein said supporting and advancing means comprises a pair of spaced drive chains mounted for movement through said twisting means, and said pusher means includes a series of spaced pusher bars freely journalled on said driving chains.

3. The twisting and spacing apparatus as defined in claim 1 wherein the twisting means comprises curved guide means for guiding articles through the twisting means, said curved guide means including an upper guide section and a complementary lower guide section separated by a horizontal slot extending the full length of said curved guide means, said horizontal slot permitting passage therethrough of said pusher means.

4. In an article processing apparatus having an article feeding chute adapted to advance abutting horizontal articles and a driven discharge conveyor adapted to receive a series of spaced vertical articles, the improvement which comprises twisting means disposed between said chute and said conveyor for engaging and progressively turning abutting articles between a position wherein the longitudinal axis of each article is horizontal and a position wherein said longitudinal axis is vertical as the article is moved past said turning means, and pusher means movable between each article for positively engaging said articles and urging them through said twisting means while spacing said articles, said pusher means comprising a pair of spaced drive chains mounted for movement through said twisting means and a series of spaced pusher bars freely journalled on said driving chains, said twisting means comprising a series of upper and lower spaced co-planar spacer plates having upper and lower article guide rods mounted thereon and separated a distance sufficient to permit passage of said pusher bars therebetween.

5. The twisting and spacing apparatus as defined by claim 4 wherein said spacer plates have a cut-out portion therein for providing a recess for accommodating articles passing through the twisting means.

6. The twisting and spacing apparatus as defined in claim 4 wherein the upper and lower spacer plates have confronting edges with cut-out portions therein and wherein the cut-out portions of associated plates cooperate to define generally rectangular openings for receiving said upper and lower rods and for permitting passage of the articles therethrough, said upper rods and upper confronting edges being spaced from said lower rods and said lower edges for allowing passage of said pusher bars through the twisting means while continuously engaging the articles.

7. A twisting and spacing apparatus for turning a row of abutting horizontal articles into a row of spaced vertical articles comprising spaced side plates, means secured to said side plates for supporting a series of abutting horizontal articles, a series of spaced upper and lower co-planar spacer plates mounted to said side plates, said upper and lower spacer plates having confronting surfaces for providing a slot therebetween, said upper and lower plates also having cut-out portions for providing a recess for articles passing therethrough, a group of curved lower guide rods secured to said lower plates and defining a lower track in the form of a helical fragment, a group of upper curved guide rods secured to said upper plates and spaced from said lower rods and defining an upper track in the form of a complementary helical fragment, a pusher means mounted for movement between said upper and lower rods and having a series of spaced freely rotatable pusher bars mounted thereon, and means for driving said pusher means whereby the pusher bars positively engage and move between the articles while in a horizontal position and thereafter urge the articles through the upper and lower guide rods wherein the articles are twisted into vertical positions.

8. A twisting and spacing apparatus for turning articles between a horizontal position and a vertical position comprising a spaced pair of complementary helically twisted segments which define a guideway for slidably receiving the articles and means for supporting said segments to define a planar slot therebetween, an endless conveyor having a series of equally spaced pusher bars movable through said slot for positively engaging said articles near their vertical midpoints for movement along said guideways whereby the articles are prevented from tipping or jamming during passage through the guideways, said helically twisted segments being arranged to closely confine the articles therein from transverse movement in all directions relative to the direction of movement of said endless conveyor, said spaced pusher bars being arranged to closely confine the articles therebetween from longitudinal movement relative to said conveyor.

9. In a twisting and spacing apparatus, the combination of an inlet chute for supporting abutting articles with their longitudinal axes in a horizontal position; an outlet conveyor for supporting articles with their longitudinal axes in a vertical position; helically twisted guide means mounted between said chute and said conveyor for turning articles from a horizontal to a vertical position; said helically twisted guide means having an upper portion and a lower portion separated by a slot; and conveying means including a series of equally spaced pusher bars and having a first portion extending over said inlet chute and being inclined downwardly toward said chute, a second portion extending through said slot, and a third portion inclined upwardly away from said outlet conveyor whereby said pushers move downwardly between the abutting articles on said chute to first space the articles a distance apart equal to the width of said pushers, then confine the articles between adjacent pushers while advancing the articles through said guide means, and to thereafter gradually withdraw the pushers from between said articles thereby releasing the articles in upright position with the space between each article being equal to the width of each pusher.

10. In an article twisting and spacing apparatus the combination of support means, first guide means defining a longitudinally extending first guideway in the form of a helical segment having a cross-section for movably accommodating and confining from transverse movement a portion of an article, second guide means defining a second guideway in the form of a longitudinally extending helical segment complementary to said first segment and having a cross-section for movably accommodating and confining from transverse movement the second portion of the article, means for supporting said guideways in spaced relationship whereby a slot is defined between said guideways, and positively driven article conveying means movable between said guideways into engagement with an article for positively advancing the article through said complementary guideways causing the article to twist about the axes of said helical segments from a first angular position to a second angular position, said conveying means having a series of equally spaced pushers movable through said slot and being spaced a distance apart sufficient to closely confine the article between a pair of pushers thereby preventing movement of the article longitudinally relative to said conveying means while moving through said complementary guide means, said first and said second guideways closely confining the article therein from transverse movement in any direction relative to the direction of movement of said conveying means.

11. In an article twisting and spacing apparatus the combination of support means, first guide means defining a longitudinally extending first guideway in the form of a helical segment having a cross-section for movably accommodating a portion of an article, second guide means defining a second guideway in the form of a longitudinally extending helical segment complementary to said first segment and having a cross-section for movably accommodating a second portion of the article, means for supporting said guideways in spaced relationship to as to define a planar slot between said guideways, means for supporting a plurality of abutting articles adjacent said slot, positively driven article conveying means, a plurality of evenly spaced article contacting elements on said conveying means movable into engagement with adjacent ones of the articles on said article supporting means for spacing the articles, said elements thereafter positively advancing the articles in predetermined spaced relationship through said complementary guideways which twist the article about the axes of said helical segments from a first angular position to a second angular position, while the article is confined through movement in any transverse direction relative to said conveying means by said first and second guide means and is confined from longitudinal movement relative to said evenly spaced article contacting elements during movement of said elements through said slot.

12. In an article handling apparatus, the combination of an inlet conveyor for supporting articles with their longitudinal axes in a horizontal position and disposed transverse to the direction of movement of articles on the conveyor, an outlet conveyor spaced from said inlet conveyor for supporting articles with their longitudinal axes in a vertical position, guide means mounted between said chute and said conveyor and having inwardly facing guide surfaces constructed and arranged to intercept articles moving therepast and progressively cam the articles to effect turing of each article about an axis extending parallel to the direction of movement of the article to move the article from its initial horizontal position to a vertical position while positively confining the article from movement in any direction transversely of said axes, said guide means being formed of two complementary parts with a slot disposed therebetween, and means including a plurality of evenly spaced pushers movable through said slot for positively engaging said articles and urging them through the guide means and onto said outlet conveyor.

References Cited by the Examiner

UNITED STATES PATENTS

| | | | |
|---|---|---|---|
| 1,277,782 | 9/1918 | Tucker. | |
| 2,207,590 | 7/1940 | Lagaard | 198—33 X |
| 2,439,075 | 4/1948 | Christiansen | 198—33 |
| 2,805,755 | 9/1957 | Jones | 198—34 |
| 3,068,990 | 12/1962 | Drennan | 198—33 |
| 3,153,471 | 10/1964 | Arnett | 198—33 X |

EVON C. BLUNK, *Primary Examiner.*

M. L. AJEMAN, *Assistant Examiner.*